(12) United States Patent
Abbott

(10) Patent No.: US 6,811,320 B1
(45) Date of Patent: Nov. 2, 2004

(54) SYSTEM FOR CONNECTING A FIBER OPTIC CABLE TO AN ELECTRONIC DEVICE

(76) Inventor: Russell Mistretta Abbott, 2616 Cross St., Riverside, CA (US) 92503

( * ) Notice: Subject to any disclaimer, the term of this patent is extended or adjusted under 35 U.S.C. 154(b) by 174 days.

(21) Appl. No.: 10/292,926

(22) Filed: Nov. 13, 2002

(51) Int. Cl.[7] ............................................... G02B 6/42
(52) U.S. Cl. .......................................... 385/58; 385/91
(58) Field of Search .............................. 385/58, 88–91; 359/15; 398/156

(56) References Cited

U.S. PATENT DOCUMENTS

| | | | | |
|---|---|---|---|---|
| 6,062,741 A | * | 5/2000 | Tachigori | 385/88 |
| 6,616,346 B1 | * | 9/2003 | Brown et al. | 385/90 |
| 6,690,865 B2 | * | 2/2004 | Miyazaki | 385/52 |

\* cited by examiner

Primary Examiner—Akm Enayet Ullah
Assistant Examiner—Jerry T. Rahll
(74) Attorney, Agent, or Firm—Chris Papageorge

(57) ABSTRACT

The system integrates an optical signal transmitter, an optical signal detector and a fiber optic cable plug connector into a unitary electronic device assembly. The electronic device, the transmitter and the detector are embedded in a substrate. The system uses an optical alignment subsystem to align the fiber optic cable connector to the substrate so that the fiber optic cable terminus is also aligned to the transmitter and detector (which are connected to the electronic device for data transfer therebetween) when the fiber optic cable is connected to the plug connector. The alignment subsystem includes a laser which backlights a hologram embedded in the transparent substrate producing an image. A camera mounted on the fiber optic cable plug connector receives the holographic image and transmits data representing that image to a microprocessor which compares it to reference image data and determines alignment parameters used to signal control units to adjust relative positioning of the connector and base to move them into alignment and move them together into a joined relationship.

21 Claims, 12 Drawing Sheets

SYSTEM FOR CONNECTING A FIBER OPTIC CABLE TO AN ELECTRONIC DEVICE

BACKGROUND OF THE INVENTION

The invention relates generally to connection assemblies for electronics and, more particularly to a fiber-optic cable system which provides a connection between a fiber optic cable and an electronic device. The system of the invention provides high precision interconnections which makes it particularly well suited for microelectronic device packages.

Because of their inherent capability of transmitting more data than any comparably sized electrical wire, fiber optic cable transmission lines have become more widely used in various electronic applications including those utilizing microelectronic components. Since fiber optic cables do not produce electromagnetic interference and are not susceptible to radio frequency interference, they have become more desirable in computer systems and avionic systems and many other types of systems in which noise interference can cause malfunction thereof. Moreover, fiber optic cable transmission systems have an additional advantage of having lower power requirements than electrical wire transmission lines of comparable data transmission capabilities. However, fiber optic cable transmission systems have the disadvantage of requiring precise alignment of their connections in order to function properly. This important disadvantage of fiber-optic cable systems has to a certain degree obviated the advantages such systems have and prevented them from more widespread use.

Current electronic packaging of devices are now confronting the problem of input and output bounding wherein the number of inputs and outputs needed is the most important factor determining the size of the device package. For example, it is now common that there are 500–700 I/O bald grid arrays in midrange personal computers. There are also higher I/O counts in high end computers as well as in data fusion or graphics applications. However, using such high pin counts has a significant drawback in that soldering the many pin connections has a certain element of risk as it takes only one failed solder joint to cause a system failure. As a result designers have investigated the use of optical interconnections between these large package devices including FPGAs, microprocessors, memory devices etc.

Current fiber-optic systems use discrete devices to convert the light pulses from the fiber-optic cable into electrical signals. The signals are then conducted to the next device using a printed circuit board to connect to high count I/O packages. The signals are then demultiplexed down to a lower data rate required by the lower speed low-power technologies. As a consequence, the I/O increases to maintain the data rate. I/O power is a significant contributor to the overall power consumption of the integrated circuit.

An optical interconnections system for electronic devices has the important advantage of enabling high data transfer between microelectronic devices. However, the development of such a system involves various problems. Such systems would require that a microelectronic package be used to mount the VCSEL transmitters and detectors as well as the fiber optic connector body onto. In addition, very precise alignment of the fiber-optic connector body and the electronic device base is required. This alignment requirement is on the order of approximately 5 to 10 microns for multimode fiber. Some applications would desire a fixed connection whereas other applications would desire a removable connection.

Prior art systems used in applying photo resistors to semiconductor wafers have utilized an alignment method. In the fabrication of the semiconductor substrates a holographic system using an infrared light is used to backlight alignment patterns on a substrate fabricated in the wafer. The substrate is transparent to the infrared light and thus can be detected by a holographic imaging and detection system to automatically align the wafer.

Some prior art approaches to providing optical communication for electronic devices involve mounting the electronic devices in a transparent substrate. Ultra-thin silicon-on-sapphire CMOS technology produces circuitry extremely well suited for optical communications functions on a transparent substrate. The silicon and sapphire process allows for flip chip bonding of optical electronic devices and to CMOS circuitry to build flipped optical chip and UTSi (FOCUTS) modules. Flip chip bonding eliminates the wire bond inductance between driving/receiving circuits and the OE devices which becomes problematic at data rates greater than 2.5 Gbps. The flip chip bonding also reduces the number of discrete chips that must be handled, packaged and aligned in the final module thereby reducing manufacturing costs. Because of the isolating substrate and the elimination of the substrate parasitic effects, the UTSI process produces high-performance CMOS circuitry requiring less power than bulk Si CMOS circuitry. In the current 0.5 micron UTSI process, modulation rates greater than 5 Gigahertz are achievable. UTSI with 0.25 micron features will be available allowing greater than 10 Gigahertz modulation. Additional byproducts of the UTSi are the availability of multi-threshold transistors in the EEPROM devices. Even with these enhancements, the standard semiconductor tools used for CMOS are also used for designing simulation fabrication packaging and testing UTSi. The fabrication process yield is comparable to bulk SI and the processed wafer cost is much less than competing high-performance technologies such as GaAs, BiCMOS and SiGe. The isolating substrate allows for mixed signal integration, as demonstrated in prior art wireless products.

Optical data communication products such as VCSELs are very cost effective due to wafer scale processing and testing and standard IC handling. Their optical properties also allow more tolerance on alignment thereby being preferable in less stringent packaging techniques. Similar cost reductions are offered by flip chip bonding OE devices to UTSi and packaging in a method compatible with electronic and fiber optic technologies.

The UTSi technology applied to optical transmitter/receiver modules allows a high degree of functional integration within the module. The non-conducting sapphire substrate of the UTSi provides a high degree of isolation between mixed signal circuits, enabling the integration of high-performance transmitters, receivers and other sensitive analog circuitry with digital circuitry. The fact that UTSi uses standard CMOS CAD tools allows easy importing of standard digital CMOS function block. Examples of key telecom blocks are digital modulation coding, your correction coding, routing, deskewing, equalization, ADC/DAC, multiplexing and demultiplexing circuitry. This integration ultimately reduces the cost and increases performance as compared to board level integration. Additionally, the UTSi process has the capability of multilevel threshold transistors and EEPROM devices. Multilevel transistors give the circuit designer added flexibility to increase performance and reduce power consumption.

EEPROM devices integrated with the drivers and logic circuitry reduces board level complexity and thereby provides another cost savings. EEPROM memory can be used for several functions including storage of trim values to equalize the drive bias on VCSEL devices across the parallel channels, hardware node address information for networking, network fault codes, error correction coefficients, initialization and training sequences for link startup.

The use of VCSELs to emit light through the UTSi substrate provides several advantages related to device packaging. Mating the fiber coupling assembly directly to the sapphire substrate creates a physically compact module. The transparent substrate enables alignment between marks on the UTSi and the fiber coupling assembly. Integration of an optical photodetector fabricated in the UTSi process for automated power control provides further advantages. The detector picks off a small percentage of the light to control the output optical power, an essential function in optical links. In addition, this through substrate design allows integration of microlens arrays directly etched into the sapphire or fabricated onto another type of substrate (such as glass) or contact mounted on the sapphire.

SUMMARY OF THE INVENTION

It is a principal object to the present invention to provide a connector system for an electronic device which enables optical signal transmission thereto and therefrom.

It is also an object of the present invention to provide a connector system for an electronic device which utilizes optical connections at the electronic device terminals for providing single point ground connections for the electronic device as well as electronic units and subsystems associated therewith.

It is also an object of the present invention to provide a connector system for connecting a fiber-optic cable plug connector to an electronic device capable of high precision alignment and attachment of a fiber-optic cable terminus connection thereto.

It is also an object of the present invention to provide a connector system for connecting a micro fiber optic cable to a micro electronic device to a micro electronic device capable of high precision alignment and attachment of a micro fiber optic cable terminus connection thereto.

It is also an object of the present invention to provide a connector system for connecting a fiber-optic cable plug connector to an electronic device having a minimal number of components thereof.

It is an object to the present invention to provide a connector system for connecting a fiber-optic cable plug connector to an electronic device which has a minimal number of electrical transmission lines for minimal power consumption.

It is an object of the present invention to provide a connector system for connecting a fiber-optic cable plug connector to an electronic device which utilizes a high precision optical alignment system providing signal transmission capability without signal loss or degradation.

It is an object to the present invention to provide a connector system for connecting a fiber-optic cable plug connector to an electronic device which has a minimal number of I/O pin connections for minimal power consumption and maximal data transfer rates.

It is an object of the present invention to provide a connector system for connecting a fiber-optic cable plug connector to an electronic device which integrates the transmitter, detector and fiber-optic cable plug into the electronic device package.

It is an object of the present invention to provide a connector system for connecting a fiber-optic cable plug connector to an electronic device which utilizes a substrate for containing the electronic device as well as the electronic units and transmission lines associated therewith.

It is an object of the present invention to provide a connector system for connecting a fiber-optic cable plug connector to an electronic device which is relatively inexpensive.

It is an object of the present invention to provide a connector system for connecting a fiber-optic cable plug connector to an electronic device utilizing optical interconnections for minimizing susceptibility to EMI and RFI.

The system of the present invention provides a connection between an optical transmission line and an electrical subsystem such as an electronic device and a fiber optic cable in order to interconnect various desired systems via the fiber optic cable interconnect. A modern electronic device is typically connected to a transmitter and detector for carrying signal data to and from the device. Essentially, the system of the invention specifically provides an interface between the terminus of the fiber optic cable and the transmitter and detector elements. The system of the present invention includes a base and a plug connector in which the fiber optic cable plug and terminus are located. The plug connector has a receptacle for receiving the fiber optic cable plug. The base has a substrate which contains the electronic device. The base also incorporates a converter for converting an electrical signal to an optical signal or for converting an optical signal to an electrical signal.

Transmitting data streams through fiber optic cable increases data transmission rates to a level that is significantly higher than what current printed wiring board technologies can support. For example, a printed wiring board made from epoxy glass material has variations in dielectric constants which make high-speed data communications difficult due to parasitic losses in the material. The higher the dielectric constant of the material the lower the maximum signal speed thus requiring controlled impedance structures typically under one Gigahertz. Polyimide glass materials have a more uniform dielectric constant that allows controlled impedance structures to support higher transmission speeds typically under two gigahertz. Using the more exotic printed materials made from Teflon derivatives will allow increased transmission speeds in the one to thirty gigahertz range. However, these types of printed wiring boards are not suitable for high layer count construction. However, optical transmission has been demonstrated to transmit ten GBit/s without any degradation in signal due to parasitic losses and noise.

Relatively low power consumption is realized by using prior art semiconductor device packaging technology using sapphire substrate. Other types of transparent mediums may be used in the substrate, but an added advantage of using sapphire is that there is no capacitive loss. The sapphire is also transparent thus allowing the VCSEL and detectors to be flip chip mounted onto the interior surface of the device while facing out toward the fiber optic cable. The sapphire is also very hard and durable allowing it to withstand handling without damaging the optical window to the VCSEL or detector. It also has the inherent characteristic of radiation hardness.

In order to produce the desired interconnections between the electronic device and the fiber optic cable plug connector, a high degree of accuracy in aligning the plug connector to the electronic device is required. The alignment method of the present invention provides alignment to within a five to ten microns positional tolerance. The positioning method of the present invention accurately, quickly and efficiently aligns the plug connector onto the base in which the opto-microelectronic device is mounted. When sapphire is used as a transparent medium, its beneficial characteristic of functioning as an optical waveguide results in light being channeled through the substrate to the area which has an alignment means used to enable determination of the position of the substrate in relation to the plug. The optical waveguide method is similar to that used in an automobile holographic center mount stoplight system and in other automobile holographic displays. The method used in automotive applications is based on that originally developed in heads up display systems for fighter aircraft.

The system of the present invention utilizes a trapped beam lighting technology to accomplish the alignment. Due to the particular optical waveguide characteristics of sapphire, light rays are refracted by the substrate and are reflected from the sides of the substrate into the interior of the substrate so that they propagate through the medium rather than passing out through the sides of the substrate. The light is injected into the side of the substrate at an angle which induces refraction of the light into the interior of the substrate and promotes internal light reflections between the sapphire/air interface at the sides of the substrate. This allows the plug connector to be aligned with either packaged or unpackaged substrate. The light is from a remote source using a fiber optic cable to direct the light into the substrate. The input angle of the light beam is selected so that it is refracted out of the substrate and through the alignment determination area with only a minor angular change. The theory and calculations of light ray reflection and refraction are defined by Snell's Law. Light from the light source is essentially trapped inside the substrate by total internal reflections from the air/sapphire interface at the various outer surfaces of the substrate.

The positioning and placement of the plug connector onto the opto micro electronic device is a several step process involving alignment of the plug connector with the substrate and secure attachment of the plug connector to the base at the substrate. This operation requires an automated positioning system consisting of a vision system for viewing the alignment images to enable determination of the position of the components to be joined and a position adjustment system for horizontal rotational and vertical linear movement to bring these components into the desired position of alignment.

The vision system used in alignment of the plug connector to the base utilizes one or more cameras to view alignment images. Essentially, the cameras receive the light passing out of the substrate and through the alignment pattern which produces the alignment images. The cameras transmit image data to a microprocessor which compares the data to reference image data. The microprocessor determines whether there is alignment and, if not, calculates the positional change of the plug relative to the base required to bring the structures into the desired alignment. The alignment system may utilize an alignment pattern in the substrate in conjunction with an alignment feature on the plug or simply utilize a holographic image from the substrate (with or without an alignment feature on the plug) to determine position and orientation of the viewing cameras/and thereby the plug in relation to the three dimensional image produced by the hologram in the substrate.

A physical translation system is utilized to move the plug vertically and to move the base horizontally. This vertical translation system is used to bring the structures into alignment in response to operational commands from the microprocessor and also move the structures into the desired degree of proximity. The translation system utilized has a repeatability of plus or minus five microns.

Once the base and the plug connector are in mutual alignment and in the desired degree of proximity to each other, the structures are secured together. This securement process preferably includes adhesive injected into the separation gap between the base and the plug. Alternatively, instead of bonding, a mating pin and hole structure may be machined into appropriate portions of the plug and base for removable connection thereof.

The system hardware is expected to provide a data flow rate of two and one-half Gbit/s. However, data flow rates can be increased to ten Gbit/s by decreasing the feature size of the electronic device to 0.25 microns.

In the commercial network market the incorporation of fiber optic cables that are integrated directly into optical electronic devices will enable the reduction in volume and cost and increase the bandwidth of the existing fiber based networks. Taking this one step further, this proposed fiber optic connector system and opto packaging assemblies become optically linked.

Additional improvements over the integration of opto and PGA devices include fitting an entire array or a variety of devices with the opto front end, enabling the creation of an integrated optical network for spacecraft. The devices needed to realize this include analog digital converters, microprocessors, memory modules and multichip modules.

It can be expected that as the space infrastructure continues to develop and on-orbit assets are deployed there will be a need to perform repair, refurbishment and refueling. Repair is self-explanatory. When an orbital asset has a module or subsystem that fails it will be far easier to send a microsat with a needed subsystem to become a permanent part of the asset. Refurbishment occurs when the entire subsystem is taken off line and replaced by a new subsystem brought to the assets by the microsat. By utilizing a fiber optic connection between the two craft the chances for any static electricity to cause harm during the docking process is mitigated.

In another application, the sensor and data fusion engine (SAFE) is used to analyze external data and relay it in a usable form by the vehicle's controlled guidance system or relay it back to the war fighter for further analysis or use. The reliability of the SAFE is a critical factor in performing its mission. To this end the SAFE must be protected from both natural and man-made phenomena. One method is to isolate the SAFE by using opto isolators on all I/O lines. This is easily accomplished by using an opto-FPGA as the I/O front end.

Another application relates to threat awareness on board spacecraft which is typically performed by a number of sensors to detect the external application of non-natural energy sources such as laser, high-energy and kinetic sources. The opto connection system of the present invention provides a robust means of data transfer from the sensors to the threat analysis computer to prevent any stray electrical noise pickup. This prevents any natural energy sources from creating a ghost signal to the threat analysis computer and interpreting the ghost signal as an attack. On the other side, a robust data transmission system will allow the spacecraft to continue to operate when an assault attempts to disrupt internal data flow.

The connector system of the present invention thus provides a means for aligning and attaching a fiber optic cable connector to an electronic device with a very high degree of precision. In addition, the system of the present invention has the desirable features of enabling such alignment and attachment to be performed on component structures which include micro electronics. The utilization of microprocessors enables the alignment to be an automated process. After the component structures are properly aligning they are either permanently securely attached with the plug securely attached to the plug connector, or the plug may be removably attached to the plug connector via appropriate pin and hole structures. The connector system advantageously provides an optical interconnect to the transmitter and detector elements of an electronic device interface that improves system performance through increased data transmission rates, lower power consumption, and opto isolation of I/O that enables a single point ground connection between subsystems that further improves performance. Essentially, the system provides integration of optical and electrical converters with an electronic device and with a fiber optic cable plug connector producing an electronic device assembly that is able to optically interconnect with other electronic devices and systems.

DETAILED DESCRIPTION OF THE PREFERRED EMBODIMENT

Figure 4:
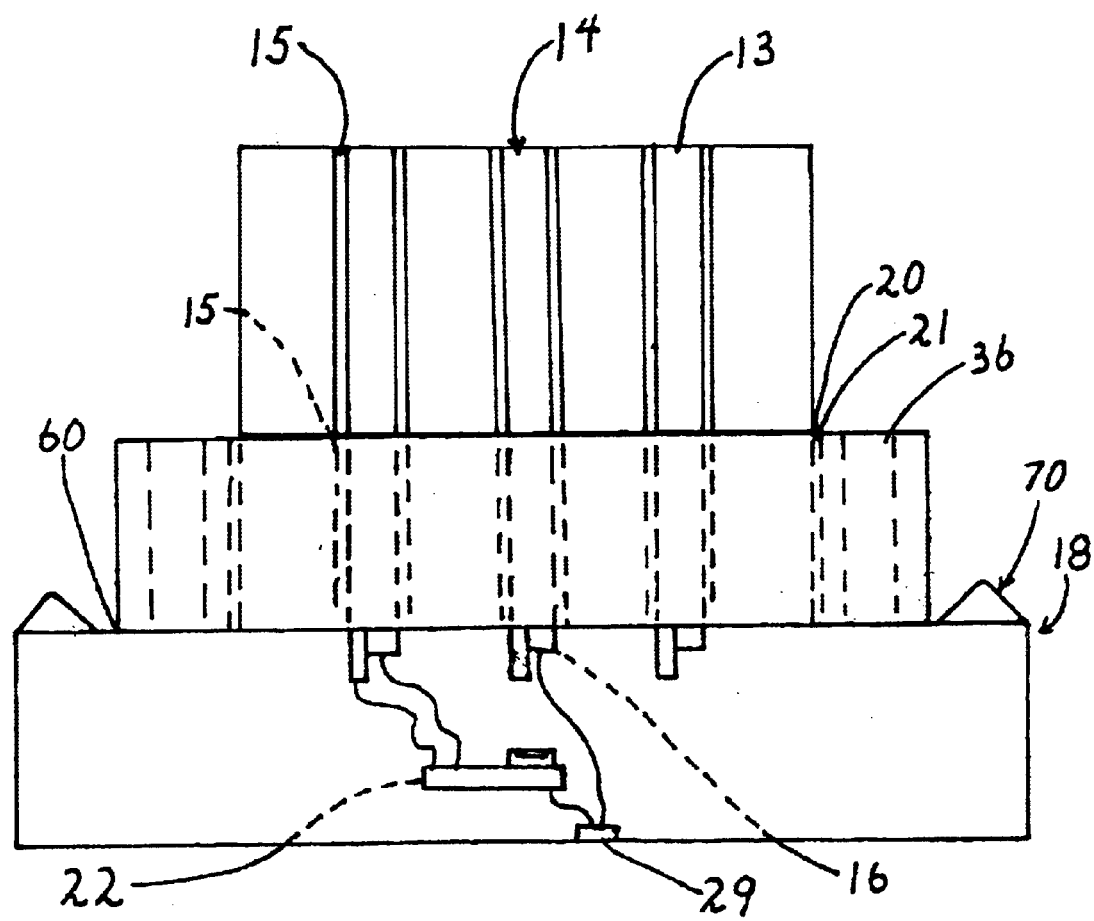
FIG. 4 is an elevated perspective view of a second embodiment of the connector system of the present invention showing the fiber optic plug connector separated from the base component containing the electronic device.
Figure 7:
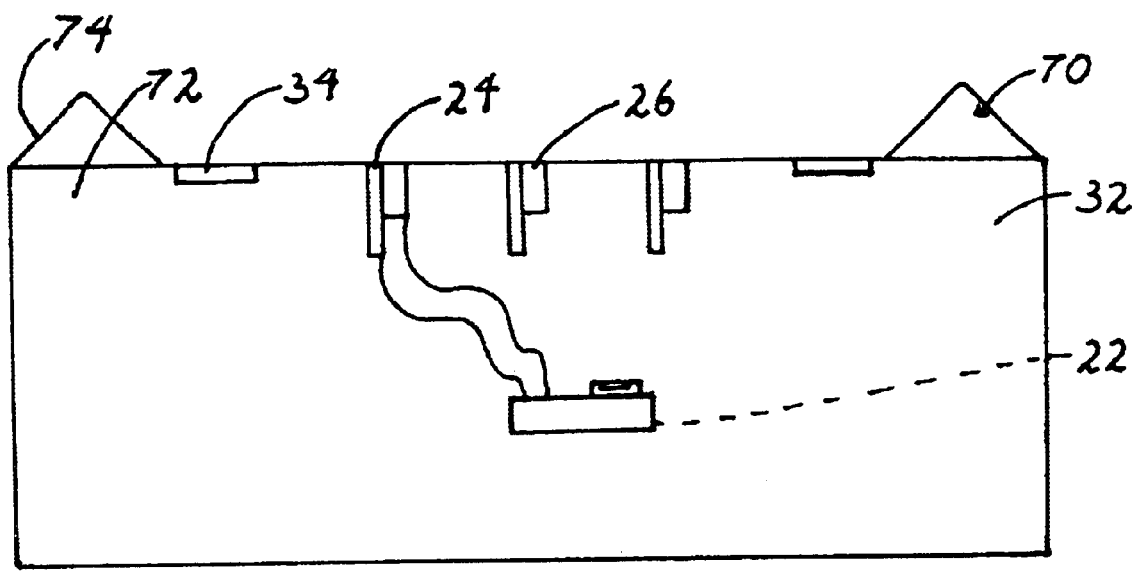
FIG. 7 is an elevated perspective view of a third embodiment of the connector system of the present invention showing the fiber optic plug connector separated from the base component containing the electronic device.

Referring to the drawings, there is shown a first embodiment of the connector system invention generally designated by the 10. FIG. 4 shows the second embodiment 110. FIG. 7 is a perspective view similar to FIG. 4 and shows a third embodiment 210 of the connector system invention. Embodiments 10, 110 and 210 are generally identical in structure except for one of the component structures thereof and except for component attachment means which will be described in detail hereinbelow.

All of the embodiments 10, 110 and 210 include a fiber-optic cable plug connector 12, 112 and 212 into which is inserted a fiber-optic cable plug 13, 113 and 213 which contains a fiber-optic cable 14, 114 and 214 so that the plug 13, 113 and 213 contains the ferule end or terminus 16, 116 and 216 thereof. The terminus 16, 116 and 216 is at a lower side of the plug 13, 113 and 213 such that it faces outward from the plug 13, 113 and 213, as shown. The plug 13, 113 and 213 preferably includes a socket 15, 115 and 215 for receiving the cable 14, 114 and 214 as well as the terminus 16, 116 and 216. The fiber-optic cable 14, 114 and 214 is a conventional fiber-optic cable.

Figure 1:
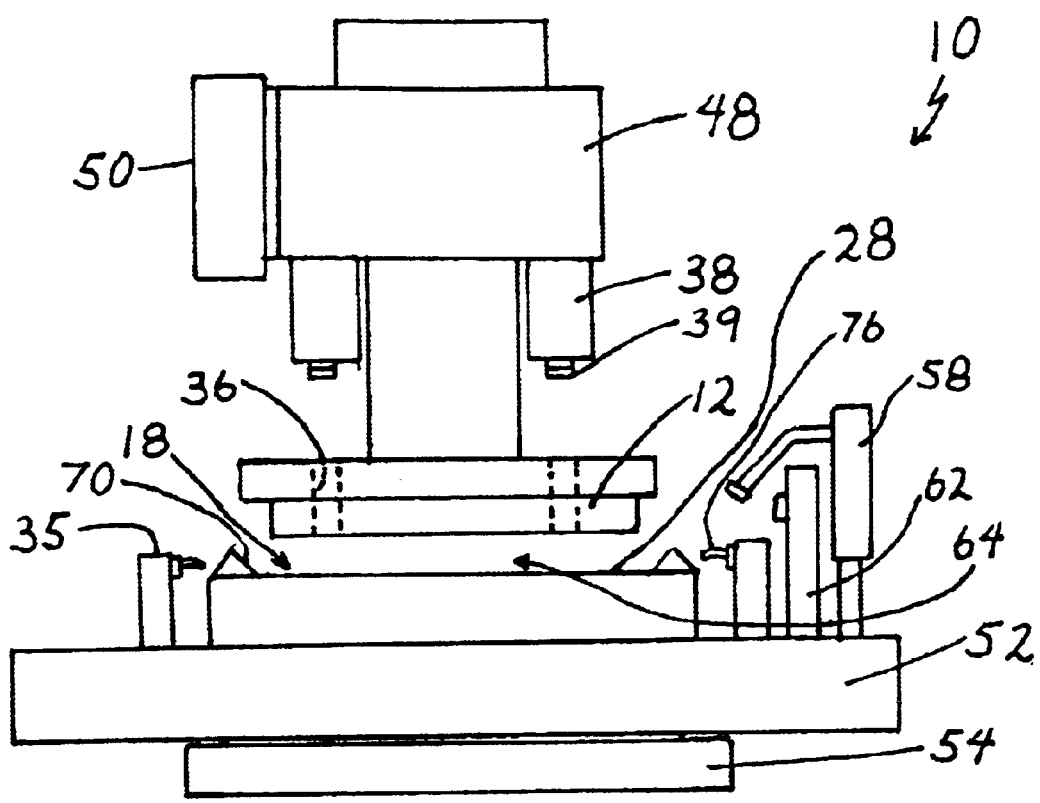
FIG. 1 is an elevated perspective view of a first embodiment of the connector system of the present invention showing the fiber optic plug connector separated from the base component containing the electronic device.
Figure 2:
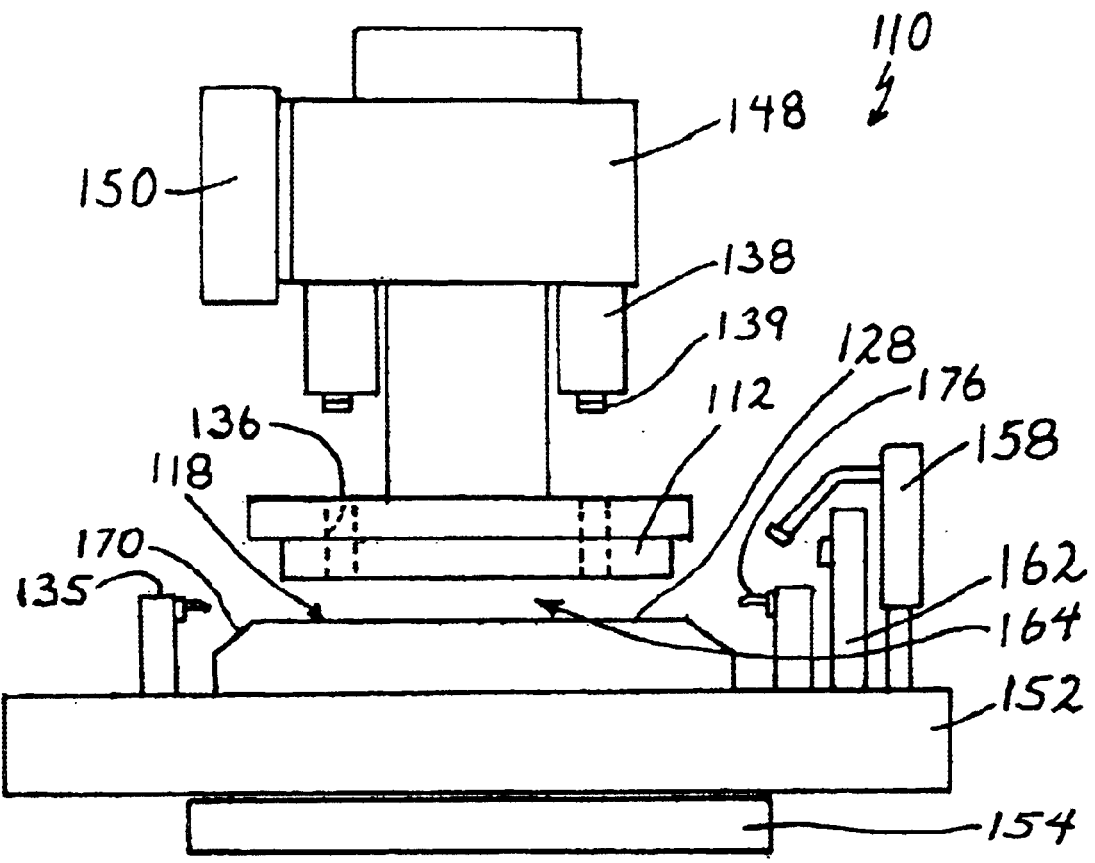
FIG. 2 is an elevated perspective view of the first embodiment of the invention showing the plug, plug connector and base components thereof joined together.
Figure 3:
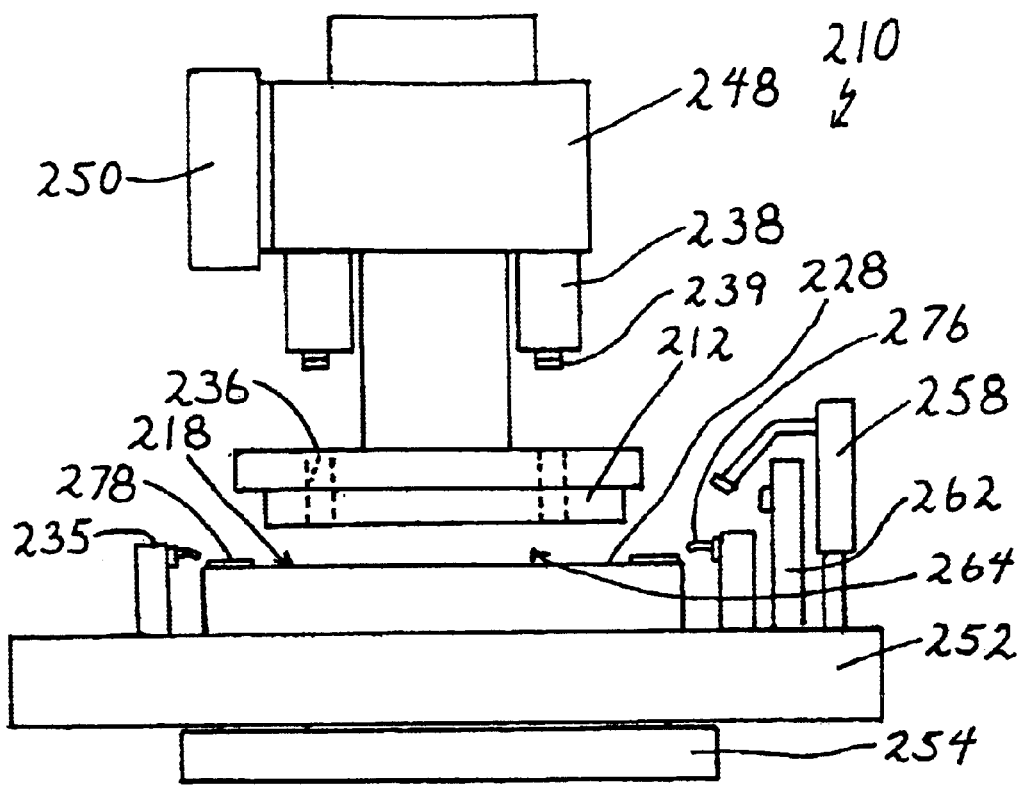
FIG. 3 is an elevated perspective view of the first embodiment of the invention showing the substrate component thereof in detail.
Figure 5:
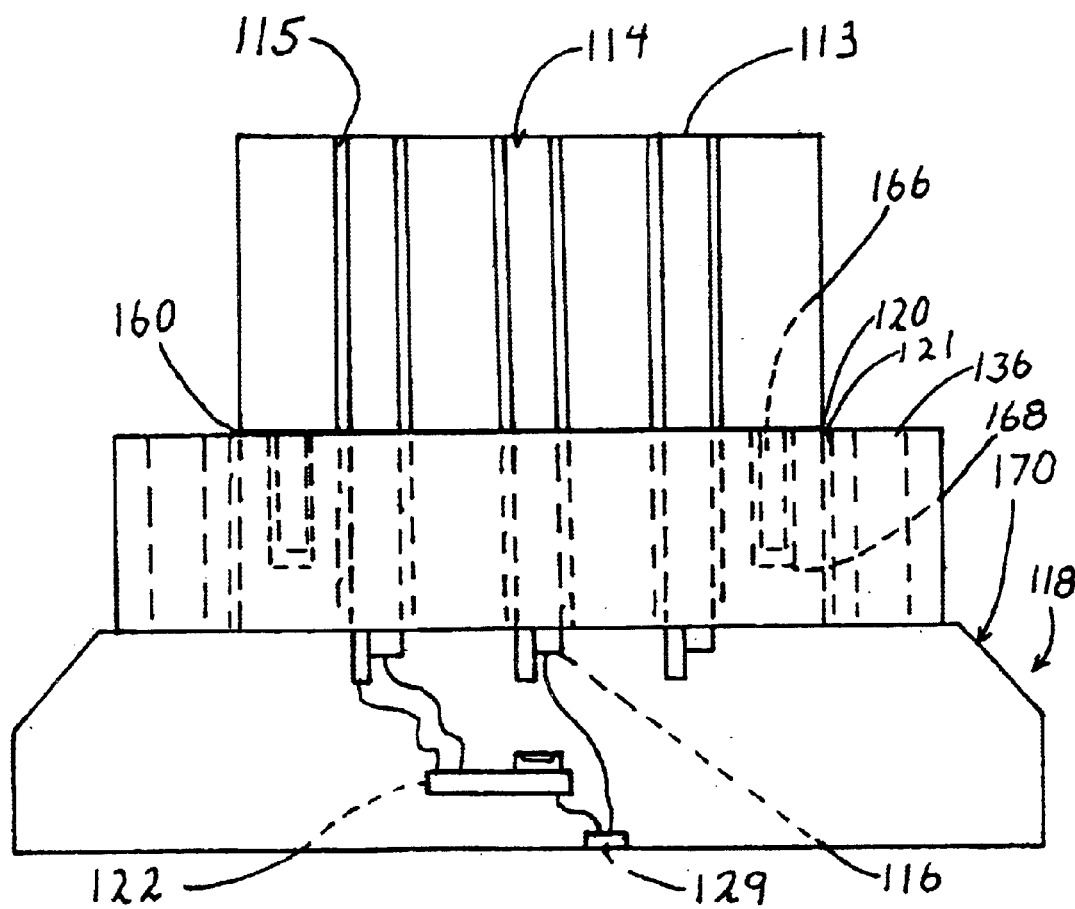
FIG. 5 is an elevated perspective view of the second embodiment of the invention showing the plug, plug connector and base components thereof joined together.
Figure 6:
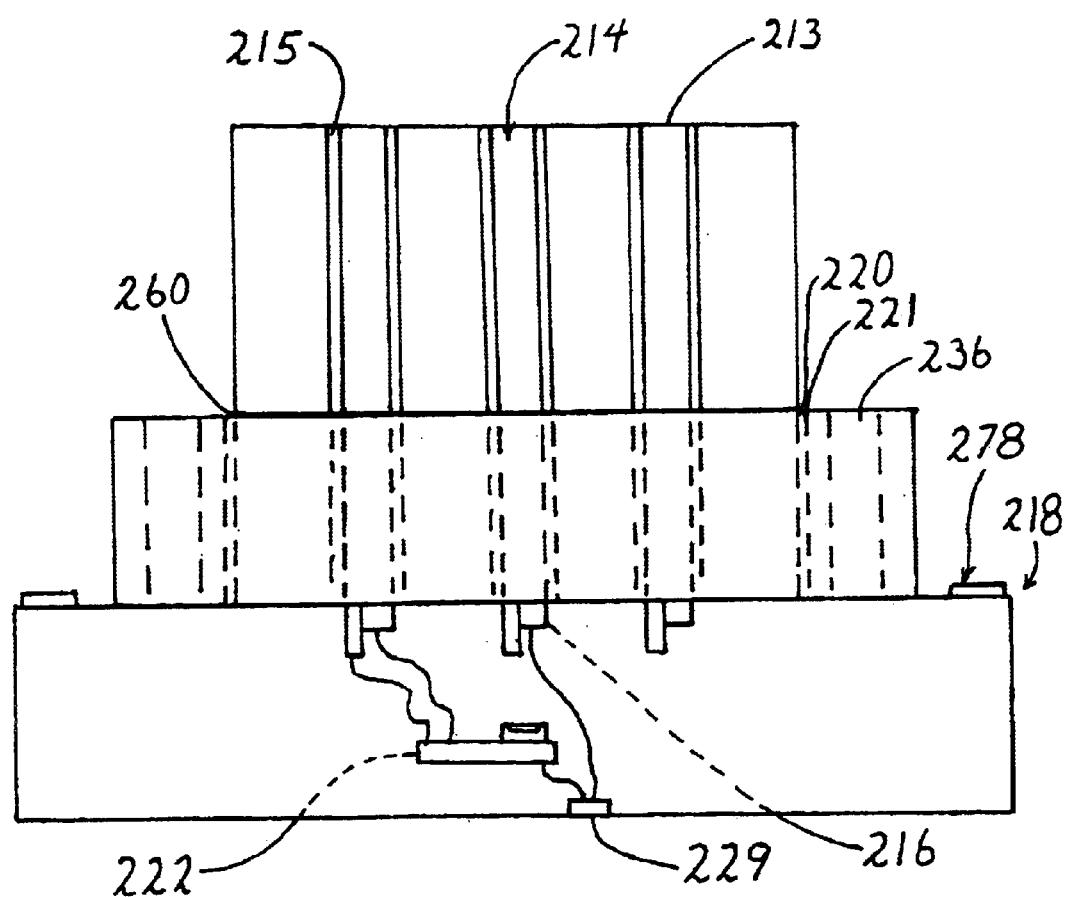
FIG. 6 is an elevated perspective view of the second embodiment of the invention showing the substrate component thereof in detail.
Figure 8:
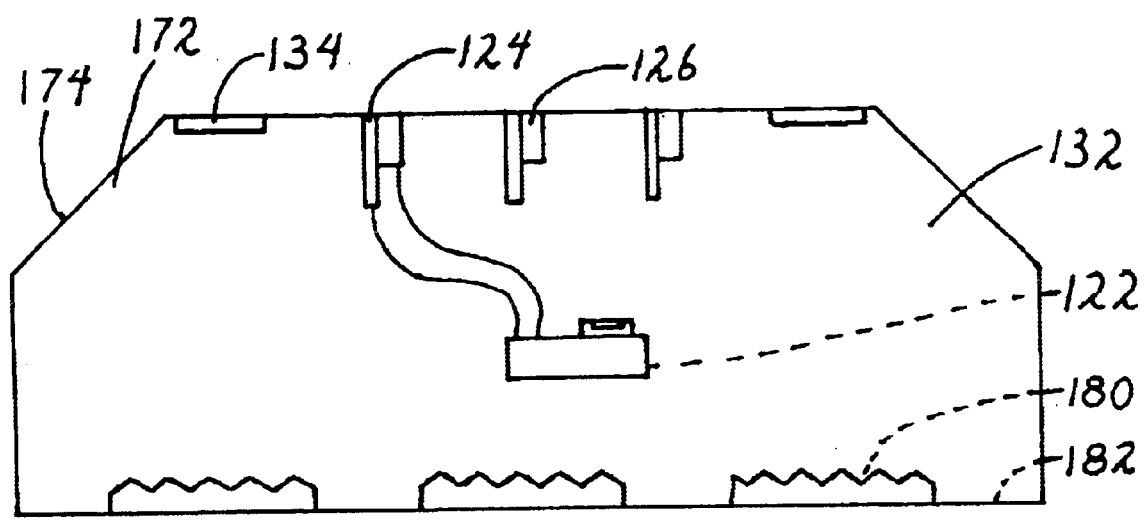
FIG. 8 is an elevated perspective view of the third embodiment of the invention showing the plug, plug connector and base components thereof joined together.
Figure 9:
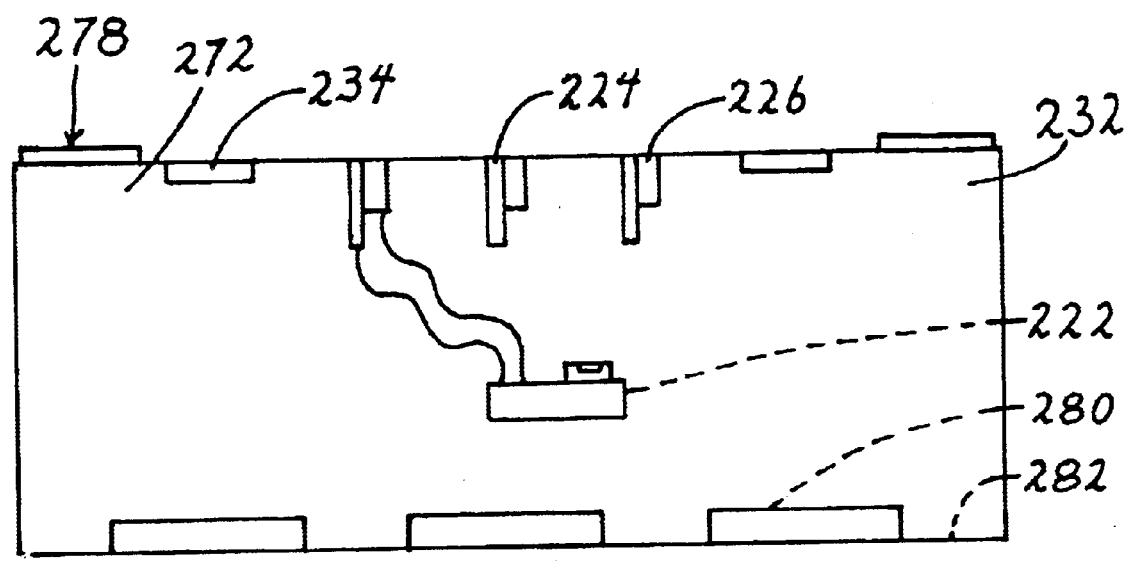
FIG. 9 is an elevated perspective view of the third embodiment of the invention showing the substrate component thereof in detail.
Figure 10:
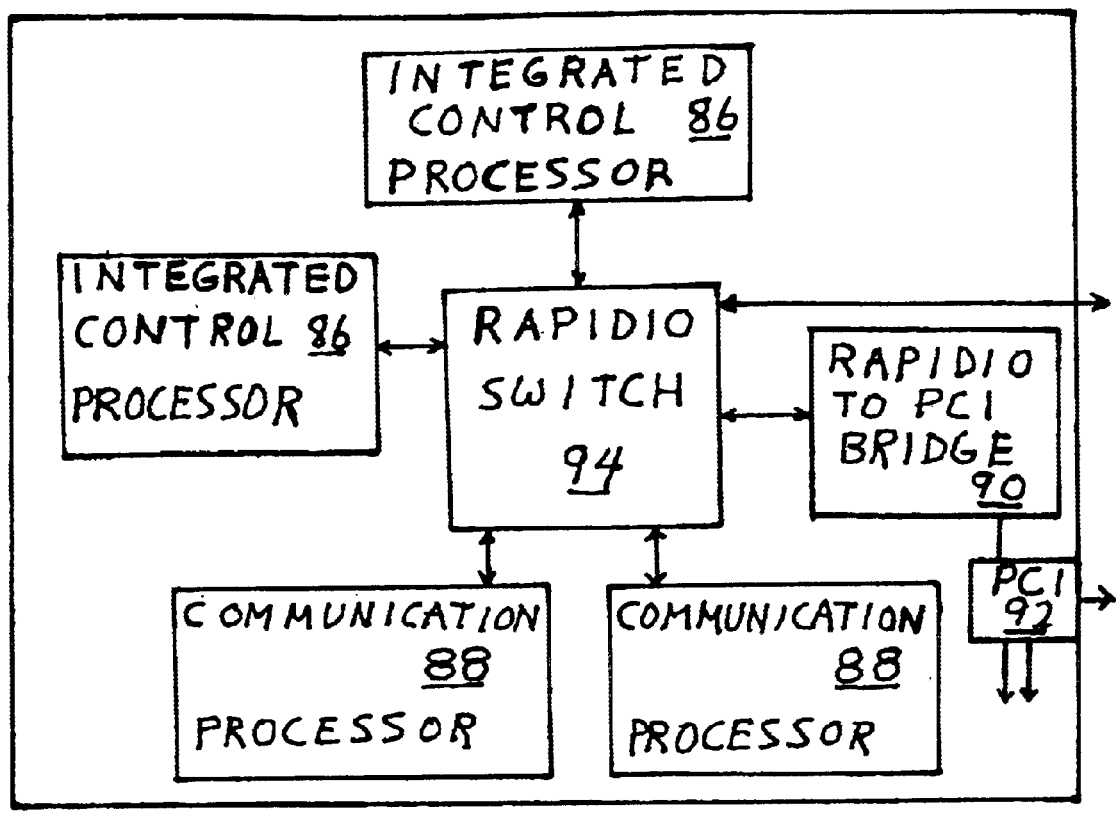
FIG. 10 is a block diagram showing a switch link fabric utilized in the electronic device and fiber optic cable plug interconnection subsystem of the first embodiment of the present invention.
Figure 11:
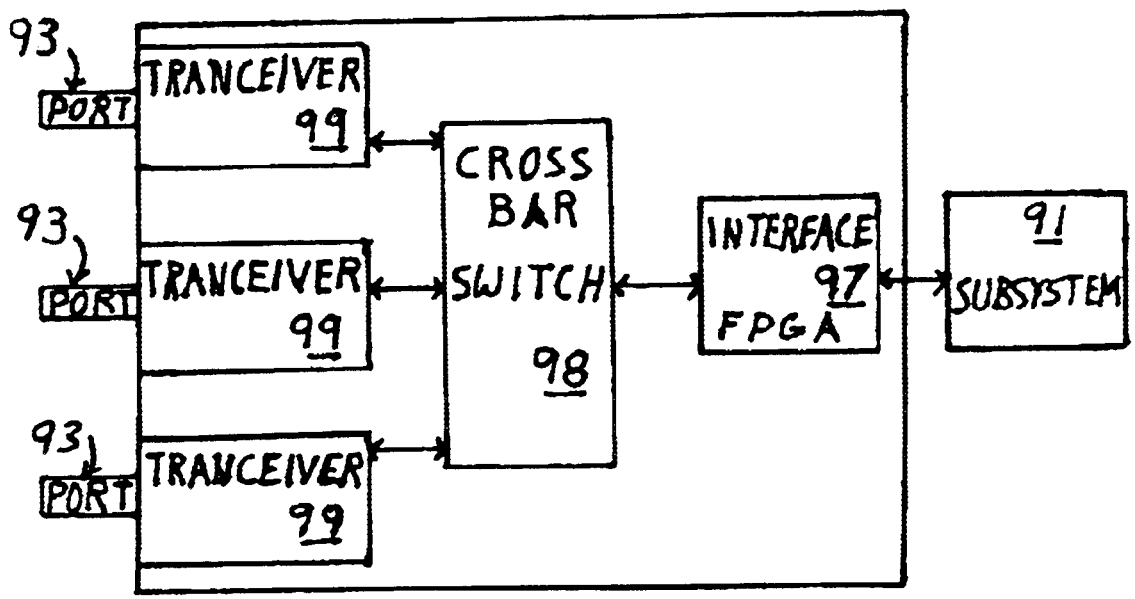
FIG. 11 is a block diagram of an optical crossbar switch used in the switch link fabric of FIG. 10.
Figure 12:
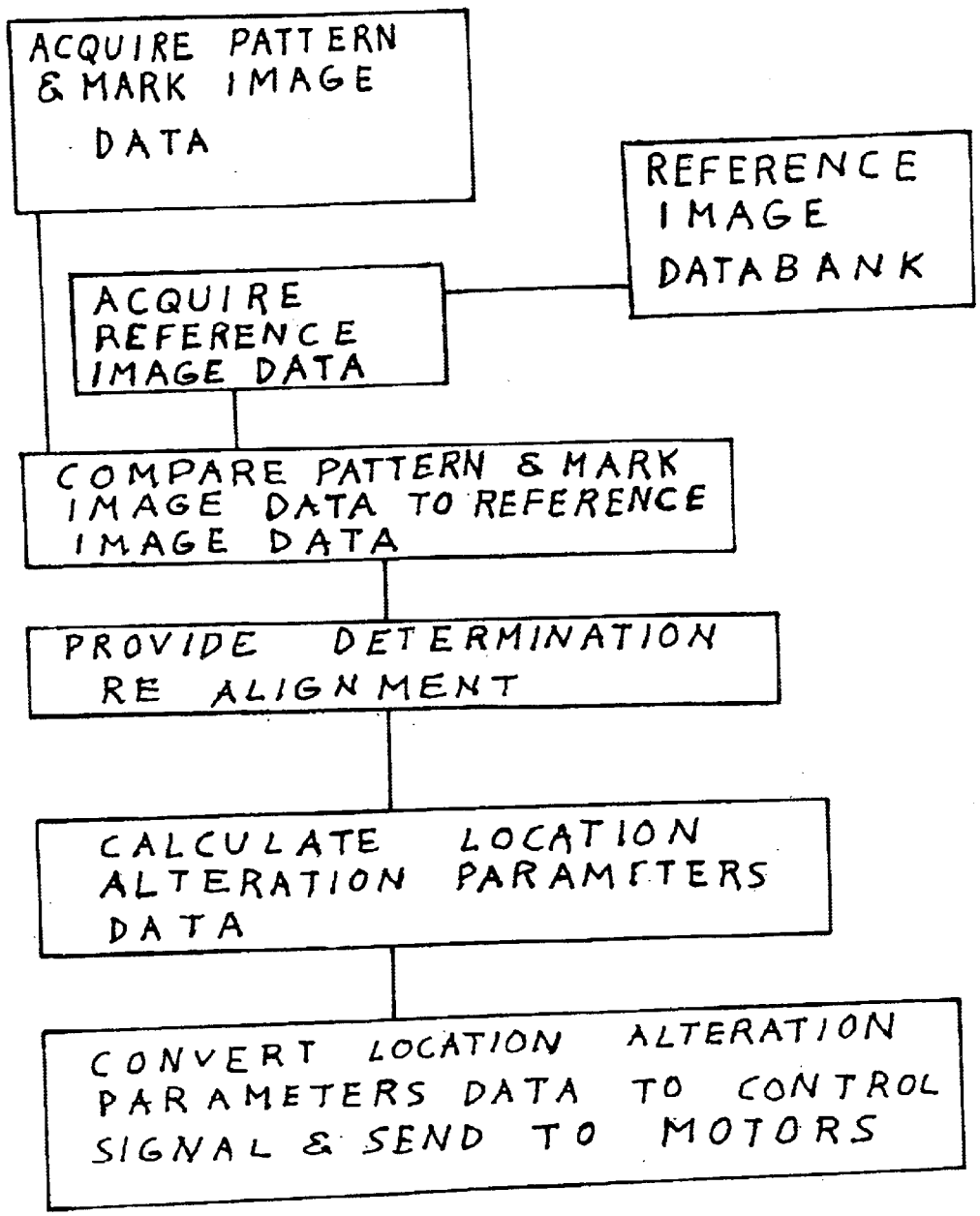
FIG. 12 is a flow chart showing the software program of the alignment subsystem of the invention.

The fiber optic cable plug 13, 113 and 213 is designed to be connected to the plug connector 12, 112 and 212 by a simple insertion of the plug 13, 113 and 213 into a receptacle 20, 120 and 220 of the plug connector 12, 112 and 212. The receptacle 20, 120 and 220 has walls 21, 121 and 221 which are preferably oriented so that they are perpendicular to the lower surface of the plug connector 12, 112 and 212. The fiber-optic cable plug connector 12, 112 and 212 is preferably oriented so that it is perpendicular to the base 18, 118 and 218, as shown in FIGS. 2, 5 and 8. The base 18, 118 and 218 preferably includes one or more electronic devices 22 which receive and transmit data to and/or from the fiber-optic cable 14, 114 and 214. Thus, the base 18, 118 and 218 is preferably connected to an electrical converter 24, 124 and 224 for converting electrical data signals into optical signals and an optical converter 26, 126 and 226 for converting optical signals into electrical data signals. The electrical converter 24, 124 and 224 is preferably an optical transmitter 24, 124 and 224. Similarly, the optical converter 26, 126 and 226 is preferably an optical detector 26, 126 and 226. The transmitter 24, 124 and 224 and detector 26, 126 and 226 are positioned at preferably an upper surface 28, 128 and 228 of the base 18, 118 and 218 so that it is proximal to the fiber-optic cable terminus 16, 116 and 216. In order to transmit optical signals between the fiber-optic cable and the transmitter 24, 124 and 224 and detector 26, 126 and 226 the gap therebetween must be optimally two-hundred and fifty microns. In addition, axial alignment therebetween cannot vary by more than five to ten microns. Thus, a high precision alignment system 30 is provided in order to enable the plug connector 12, 112 and 212 and base 18, 118 and 218 to be joined together properly so that there is complete signal transmission between the fiber-optic cable and the converter 24, 124 and 224 and 26. The base 18, 118 and 218 also has a single point ground terminal 29, 129 and 229 for connection to the electronic device 22, 122 and 222 as well as for the converters 24, 124 and 224 and 26, 126 and 226.

The transmitter 22, 122 and 222 is preferably a VCSEL type of laser 22, 122 and 222. VCSEL type laser transmitters are semiconductors and micro sized rendering them suitable for use in conjunction with fiber optic data transfer lines in which the strands thereof are only two-hundred and fifty microns apart.

The base 18, 118 and 218 18 preferably includes a substrate 32, 132 and 232 in which are embedded the electronic device 22, 122 and 222 and the converter 24, 124 and 224 and 26, 126 and 226. The substrate 32, 132 and 232 is preferably composed of sapphire so that it is electrically insulating for the electronic devices 22, 122 and 222, the converter 24, 124 and 224 and 26 as well as the electrical interconnections therebetween. The sapphire substrate 32, 132 and 232 also provides thermal insulation for these electronic components thereby protecting them from thermal damage or impaired performance due to adverse thermal effects. The substrate 32, 132 and 232 also provides environmental isolation of the electronic device 22, 122 and 222 as well as other electronic components and transmission lines therein. The substrate 32, 132 and 232 preferably also includes an alignment pattern 34, 134 and 234 which is etched therein preferably at upper surface 28. The sapphire substrate 32, 132 and 232 is transparent allowing a laser 35, 135 and 235 to emit a beam into the substrate 32, 132 and 232 for the purpose of backlighting the alignment pattern 34, 134 and 234 thereby producing a pattern image. The alignment pattern 34, 134 and 234 is preferably a transmission hologram 34, 134 and 234. The holographic image which is produced provides a three-dimensional image which also provides the location of the hologram and of the base 18, 118 and 218 in three dimensions. However, other suitable types of alignment patterns may be etched or otherwise provided in the sapphire substrate 32, 132 and 232. The light beam which provides the image is preferably emitted from the substrate 32, 132 and 232 through a window or opening 36, 136 and 236 in the plug connector 12, 112 and 212. The direction of propagation of the beam from the substrate 32, 132 and 232 and through the window 36, 136 and 236 is preferably in the direction of the axis of the plug connector 12, 112 and 212 and perpendicular to the base 18, 118 and 218. Preferably a pair of cameras 38, 138 and 238 are provided and fixed to the plug connector 12, 112 and 212 so that there is no relative movement therebetween. Alternatively, the cameras 38, 138 and 238 may be mounted separate from the other components of the system 10, 110 and 210. The cameras 38, 138 and 238 are preferably oriented and positioned so that they face the window 36, 136 and 236 and receive the pattern image that is displayed therethrough. The cameras 38, 138 and 238 also view a pair of alignment marks 40, 140 and 240 located on opposing sides of the plug connector 12, 112 and 212. The laser 35, 135 and 235 light beam which provides the pattern image also illuminates the alignment marks 40, 140 and 240 so that the cameras 38, 138 and 238 view the alignment marks in conjunction with the pattern image. Thus, the pattern image essentially provides visual information regarding the position of the base 18, 118 and 218 while the alignment mark image provides visual information regarding the position of the plug connector. The cameras 38, 138 and 238 which view the pattern image together with the alignment marks consequently receive visual information regarding the position of the base 18, 118 and 218 relative to the plug connector 12, 112 and 212. The cameras 38, 138 and 238 preferably have a magnification lens (or other type of suitable magnification optics) 39, 139 and 239 to provide a desired view of images from a micro electronic device assembly. The cameras 38, 138 and 238 preferably are digital cameras 38, 138 and 238 incorporating a digitizer which digitizes the visual information of the pattern image and alignment marks and transmits the digitized data to a microprocessor 42, 142 and 242. The microprocessor 42, 142 and 242 preferably includes a software program 44, 144 and 244 which acquires the image data relating to the pattern image and the alignment mark image and compares them to reference data relating to references images contained in a databank 46, 146 and 246. From this comparison the microprocessor 42, 142 and 242 determines the location parameters of the base 18, 118 and 218 relative to the plug connector 12, 112 and 212 and determines whether or not the plug connector 12, 112 and 212 is in alignment with the base 18, 118 and 218. If it determines they are in misalignment, the microprocessor 42, 142 and 242 calculates the degree of misalignment and the direction of misalignment. The holographic image provides data that allows this to be calculated for three dimensions thereby providing calculations relating to tilt, relative vertical position and relative horizontal position.

A vertical translation structure 48, 148 and 248 is securely attached to the plug connector 12, 112 and 212 and includes a motor 50, 150 and 250. The cameras 38, 138 and 238 are preferably mounted on the vertical translation structure 48, 148 and 248 so that there is no movement therebetween. Vertical translation structure 48, 148 and 248 and motor 50, 150 and 250 are used to move the plug connector 12, 112 and 212 up and down in a vertical direction in response to the microprocessor's commands when the microprocessor 42, 142 and 242 has determined the plug connector 12, 112 and 212 and base 18, 118 and 218 are in the desired position of alignment so that moving the plug connector 12, 112 and 212 and the base 18, 118 and 218 together is appropriate.

An orientation table 52, 152 and 252 is securely attached to the base 18, 118 and 218 and includes a motor 50, 150 and 250. The orientation table 52, 152 and 252 and the motor 50, 150 and 250 are used to move the base 18, 118 and 218 horizontally in a linear direction as well as horizontally in a rotational direction. The table and motor 50, 150 and 250 are also able to move the base 18, 118 and 218 in a vertical rotational direction i.e., to adjust tilt between the plug connector and the base 18, 118 and 218. Thus, when the microprocessor 42, 142 and 242 has determined that there is misalignment it commands the table 52, 152 and 252 and motor 50, 150 and 250 to move the base 18, 118 and 218 in accordance therewith and thereby placing the plug connector 12, 112 and 212 and base 18, 118 and 218 in the desired relative position in which they are in mutual alignment. The software program 44, 144 and 244 of the microprocessor 42, 142 and 242 makes a calculation of the degree of movement required for the plug connector 12, 112 and 212 and the base 18, 118 and 218 and converts these calculations into control signals for operation of the motors 50, 150 and 250 and 52, 152 and 252.

After the plug connector 12, 112 and 212 and the base 18, 118 and 218 are moved together into the desired position, these components are secured together by means of attachment means 56, 156 and 256. The attachment means 56, 156 and 256 comprises an adhesive injector 58, 158 and 258 and a curing lamp 62, 162 and 262. When the plug connector 12, 112 and 212 and base 18, 118 and 218 are in the desired positions, the injector 58, 158 and 258 injects adhesive 60, 160 and 260 into the separation gap 64, 164 and 264 between the plug connector 12, 112 and 212 and the base 18, 118 and 218. The adhesive 60, 160 and 260 is preferably an epoxy type of adhesive so that it requires the curing lamp 62, 162 and 262 to illuminate it with ultraviolet light for curing thereof.

In the second embodiment of the invention, a pin 166 is provided in the plug 113 and a hole 168 is provided in the plug connector 112. The pin 166 and hole 168 are relatively sized so that the pin mates with the hole such that the hole receives the pin when the plug 113 is plugged into the plug connector 112. The pin 166 and hole 168 thus enable the plug 113 and plug connector 112 to be securely connected together. The pin 166 and hole 168 preferably provide sufficient frictional force therebetween to hold these structures together. The frictional force may be provided by means of a conventional finger structure (not shown) on the pin 166, or there may be an additional fastener structure (not shown) associated with the pin 166 and hole 168. The pin and hole structures enable the plug 113 to be removable from the plug connector 112.

In the first embodiment 10, the light beam from the laser 35 is preferably directed into the substrate 32 at the desired angle by means of the prism 70. The prism 70 is preferably positioned at upper outer surface end portion 72 of the base 18. The prism 70 is preferably triangular in lateral cross-section forming a wedge. Thus, the face 74 of the prism 70 which receives the light from the laser is preferably angled at preferably an angle of forty-five degrees. This forty-five degree angle results in the light being refracted in the substrate at that selected angle of refraction which results in it being directed out of the substrate through the window 36. To facilitate proper setting of the desired specific orientation of the input light beam, an alignment fiber-optic cable 76 is provided between the output of the laser 35 and the face 74 of the prism 70. Use of the fiber-optic cable 76 additionally ensures that the light beam from the laser shines on the face 74 instead of on adjacent components of the system. Consequently, the light beam is at a specific angle selected so that in conjunction with the specific angular orientation of the face 74 the combination of these angles results in the desired degree of light beam refraction when inside the substrate so that the beam is emitted outwardly therefrom through the window 36.

In the second embodiment 110, the substrate 132 is preferably notched at an end thereof to provide a desired angled face for the incoming light beam instead of having a prism. Thus, the second embodiment has a notched end portion 170 located at preferably the outer upper end surface portion 172 of the base 118. The face 174 of the notched end 170 is preferably at an angle of forty-five degrees, as is the face 74 of prism 70. Embodiment 110 also has an alignment fiber-optic cable 176 positioned between the laser 135 and the face 174 to direct the laser light beam into the substrate at the desired specific input angle. Consequently, as with embodiment 10, the alignment light beam is input into the substrate at that specific desired angle which results in the desired degree of refraction when inside the substrate so that it is emitted outwardly therefrom through the window.

The sapphire composition of the substrate 32 (and 132 and 232) in effect channels the light therein so that it does not pass through but instead continually reflects off the inner surfaces of the substrate 32, 132 and 232. Thus, the sapphire substrate 32, 132 and 232 acts as an optical waveguide so that the light is emitted therefrom only through the window 36, 136 and 236. To ensure that there is complete channeling of the light within the substrate, the substrate 132 is provided with a metalized Fresnel lens 180. The Fresnel lens 180 is preferably positioned at a lower inner surface 182 of the substrate 132 and functions to reflect light impinging thereon back into the interior of the substrate 132.

In the third embodiment of the invention, an input coupling hologram 278 is provided at the substrate 232 and located at the outer upper and surface portion 272 of the base 218. The input coupling hologram 178 reflects the light beam coming thereinto from the laser 235 and alignment fiber-optic cable 276 so that it enters the substrate 232 at the desired selected angle which results in its being refracted outwardly from the substrate 232 through the window 236. Thus, the input coupling hologram 178 essentially functions as the prism 70 of embodiment 10 and notched end 170 of embodiment 110.

To ensure that there is complete channeling of the light within the substrate, the substrate 232 is provided with a reflection hologram 280. The reflection hologram 280 is preferably positioned at a lower inner surface 282 of the substrate and functions to reflect light impinging thereon back into the interior of the substrate. Thus, reflection hologram 280 performs the same function as the Fresnel lens 180 of embodiment 110.

The connector system 10 enables optical linking of optical packaging devices and subsystems. FIG. 7 shows a switch link fabric 84 which enables such optical interlinking. The switch link fabric 84 includes an integrated control processor 86, a communication processor 88, a rapidio to PCI bridge 90 and a rapidio switch 94. The rapidio to PCI bridge 90 is connected to a PCI 92. The integrated control processor 86, the communication processor 88 and rapidio to PCI bridge 90 are all connected to the rapidio switch 94 via fiber optical interconnects 96. The switch link fabric 84 features opto isolation and enables single point grounding of sensors, high-speed signals and analog and digital signals.

The central component to the implementation of the switch link fabric 84 is an optical crossbar switch 98 shown in FIG. 8. The crossbar switch 98 is connected to a set of fiber optic transceivers 99 and an interface FPGA 97 via fiber-optic interconnects 95. The optic transceivers 99 send and receive data via connection to ports 93 which are connected to the plurality of fiber optic cables 14, 114 and 214. The interface FPGA is connected to a subsystem 91 for sending and receiving data therefrom and thereto. The crossbar switch 98 is electronically switched by means of integrated circuits in conjunction with the microprocessors 86 and 88. The optical crossbar switch is enabled by the integration of a fiber-optic cable connector, VCSEL and detector array, transceivers and FPGA into a unitary package.

Accordingly, there has been provided, in accordance with the invention a connector system for interfacing a fiber-optic cable with an electronic device which provides a high degree of precision in alignment of fiber-optic cable terminus to the electronic device interface. It is to be understood that all the terms used herein are descriptive rather than limiting. Although the invention has been described in conjunction with the specific embodiments set forth above, many alternative embodiments, modifications and variations will be apparent to those skilled in the art in light of the disclosure set forth herein. Accordingly, it is intended to include all such alternative embodiments, modifications and variations that fall within the spirit and scope of the invention as set forth in the claims herein below.

What is claimed is:

1. A system for connecting a fiber optic cable to an electronic device, comprising:

a fiber optic cable plug connector, having a socket for the cable;

a base containing an electronic device mounted therein;

a transparent substrate mounted in said base, said substrate including an alignment pattern therein;

a laser for directing light through said alignment pattern and out from said substrate;

a digital camera for receiving light passing through said alignment pattern, said digital camera fixed to said plug connector for enabling alignment of said plug connector relative to said base;

means for attaching said plug connector to said base after alignment thereof.

2. The system of claim 1 further including an orientation table, said base mounted on said orientation table, said orientation table having lateral translation and rotational capability for facilitating positioning of said base relative to said plug connector for alignment thereof, said orientation table having an orientation table motor for providing said lateral translation and rotational capability and including an orientation microprocessor connected to said orientation table motor for controlling said motor.

3. The system of claim 1 further including a vertical translation structure, said plug connector mounted on said vertical translation structure, said vertical translation structure having vertical translation capability for facilitating positioning of said plug connector relative to said base, said vertical translation structure having a vertical structure motor and including a vertical translation microprocessor for controlling said vertical structure motor.

4. The system of claim 1 further including a reflection hologram in said substrate at a lower surface thereof to reflect light from said laser toward said alignment pattern.

5. The system of claim 1 further including a metalized Fersnel lens in said substrate at a lower surface thereof to reflect light from said laser toward said alignment pattern.

6. The system of claim 1 further including a main microprocessor connected to said digital camera for receiving images therefrom for facilitating alignment of said plug connector relative to said base.

7. The system of claim 6 wherein said main microprocessor includes a software program for comparing images received via illumination of said pattern with reference images contained in a databank of said microprocessor in order to provide alignment determination.

8. The system of claim 1 wherein said substrate is composed of sapphire material acting as an optical waveguide for the light emitted thereinto from said laser, said electronic device completely embedded in said sapphire material to insulate and isolate the electronic device from environment.

9. The system of claim 1 wherein said base includes a prism mounted at an outer upper end surface of said substrate for receiving light from said laser and directing it into said substrate.

10. The system of claim 1 wherein said substrate is notched at an outer upper end portion thereof so that the outer upper end portion is angled at its outer surface to provide a desired degree of light refraction of light from said laser into said substrate.

11. The system of claim 1 wherein said base includes a receptacle for receiving said plug connector.

12. The system of claim 1 wherein the receptacle is partly defined by walls that extend perpendicularly from an upper surface of said base so that said plug connector is oriented in a perpendicular relationship to said base when connected thereto.

13. The system of claim 1 wherein said laser emits light within visible light spectrum.

14. The system of claim 1 further including a fiber optic cable interface mounted in said base and connected to said electronic device, said interface including a first converter for converting optical signals to electrical signals and a second converter for converting electrical signals to optical signals.

15. The system of claim 14 wherein said first converter includes a detector for detecting optical signals and said second converter includes a transmitter for transmitting optical signals, said transmitter including a VCSEL light transmitter.

16. The system of claim 14 further including a single point ground terminal connected to said base and to said first and second converters and said electronic device.

17. The system of claim 14 wherein said socket includes a plurality of sockets and further including a cross bar switch and a set of ports connected to said plurality of sockets for selecting input and/or output signals from any of the plurality of fiber optic cables.

18. The system of claim 1 wherein said means for securing includes a pin in said plug connector and wherein said base has a hole sized so that said pin is matable with said hole to provide removable securement of said plug connector to said base after alignment thereof.

19. The system of claim 1 wherein said means for securing includes an injector for injecting adhesive at a separation gap between said plug connector and said base for bonding said plug connector to said base.

20. The system of claim 19 wherein said means for securing includes an ultraviolet lamp for illuminating the gap between said plug connector and said base after said injector has injected adhesive thereinto in order to cure the adhesive.

21. A system for connecting a fiber optic cable to an electronic device, comprising:

a fiber optic cable plug connector, having a socket for the cable;

a sapphire substrate having a transmission hologram therein, said substrate having electronic device mounted therein;

a laser for emitting light into said substrate and through said hologram, said laser emitting light in visible light spectrum, said laser oriented and positioned relative to said substrate so that said substrate refracts light emitted from said laser into and through said hologram and outward from said substrate toward said plug connector;

a metalized Fresnel lens mounted at a lower inner surface of said substrate for reflecting light from said laser through said hologram and outwardly from said substrate toward said plug connector;

a digital camera for receiving light passing through said hologram and out from said substrate, said digital camera mounted on said plug connector for enabling alignment of said plug connector relative to said base;

a vertical translation structure, said plug connector mounted on said vertical translation structure, said vertical translation structure having vertical translation capability for facilitating positioning of said plug connector relative to said base, said vertical translation structure having a vertical structure motor;

an orientation table, said base mounted on said orientation table, said orientation table having lateral translation and rotational capability for facilitating positioning of said base relative to said plug connector for alignment thereof, said orientation table having an orientation table motor for providing said lateral translation and rotational capability;

a microprocessor including a software program for comparing image received via illumination of the hologram by said laser with reference images contained in a databank of said microprocessor in order to provide alignment determination, said microprocessor connected to said orientation table for controlling said orientation table motor in order to produce relative movement of said plug connector and said base to provide proper alignment thereof in response to alignment determination and connected to said vertical translation motor in response to alignment determination;

an adhesive injector for injecting epoxy adhesive a separation gap between said plug connector and said substrate for securely interconnecting said plug connector and said base;

an ultraviolet lamp for illuminating epoxy adhesive between said plug connector and said substrate for curing the epoxy adhesive.

* * * * *